1

United States Patent
Jain et al.

(10) Patent No.: US 10,044,610 B2
(45) Date of Patent: Aug. 7, 2018

(54) SYSTEM, METHOD AND APPARATUS PROVIDING BI-DIRECTIONAL FORWARDING DETECTION SUPPORT TO UNNUMBERED IP INTERFACES

(71) Applicants: Pradeep G. Jain, Sunnyvale, CA (US); Kanwar D. Singh, Mountain View, CA (US)

(72) Inventors: Pradeep G. Jain, Sunnyvale, CA (US); Kanwar D. Singh, Mountain View, CA (US)

(73) Assignee: Alcatel Lucent, Boulogne-Billancourt (FR)

( * ) Notice: Subject to any disclaimer, the term of this patent is extended or adjusted under 35 U.S.C. 154(b) by 562 days.

(21) Appl. No.: 14/144,878

(22) Filed: Dec. 31, 2013

(65) Prior Publication Data
US 2015/0188814 A1 Jul. 2, 2015

(51) Int. Cl.
*H04L 12/741* (2013.01)
*H04L 12/723* (2013.01)
*H04L 12/703* (2013.01)

(52) U.S. Cl.
CPC ............. *H04L 45/74* (2013.01); *H04L 45/28* (2013.01); *H04L 45/50* (2013.01)

(58) Field of Classification Search
CPC ......... H04L 45/74; H04L 45/50; H04L 43/10; H04L 41/0686; H04L 45/28; H04L 43/0811; H04L 45/22
USPC ....... 370/216, 228, 241, 242, 248, 250, 254, 370/256, 328, 389, 390, 392; 709/220, 709/224, 230, 239
See application file for complete search history.

(56) References Cited

U.S. PATENT DOCUMENTS

| | | | | |
|---|---|---|---|---|
| 8,953,460 | B1* | 2/2015 | Addepalli | H04L 43/10 370/241 |
| 9,258,234 | B1* | 2/2016 | Addepalli | H04L 47/12 |
| 2010/0023632 | A1* | 1/2010 | Liu | H04L 12/4633 709/230 |
| 2010/0049868 | A1* | 2/2010 | Ginsberg | H04L 45/00 709/242 |
| 2013/0070764 | A1* | 3/2013 | Boutros | H04L 49/351 370/390 |
| 2013/0159549 | A1* | 6/2013 | Kompella | H04L 45/74 709/239 |
| 2014/0307564 | A1* | 10/2014 | Li | H04L 67/141 370/242 |
| 2015/0236920 | A1* | 8/2015 | Bevilacqua | H04L 41/12 709/224 |
| 2015/0312139 | A1* | 10/2015 | Li | H04L 45/00 370/351 |

OTHER PUBLICATIONS

International Search Report and Written Opinion of PCT/US2014/066492, dated Feb. 24, 2015, pp. 1-11.

(Continued)

*Primary Examiner* — Walli Butt
(74) *Attorney, Agent, or Firm* — Tong, Rea, Bentley & Kim, LLC

(57) ABSTRACT

A system, method and apparatus providing BFD support to unnumbered IP Interfaces in MPLS networks using a newly defined interface identifier (IF-ID) sub-object included within one or more BFD protocol messages to extend the use of BFD protocol to unnumbered IP interfaces.

18 Claims, 6 Drawing Sheets

(56) References Cited

OTHER PUBLICATIONS

N. Akiya et al, "Seamless Bidirectional Forwarding Detection (BFD) with MPLS Label Verification Extension; draft-akiya-bfd-seamless-base-02.txt", Internet Engineering Task Force, IETF; Standarworkingdraft, Internet Society (ISOC) 4, Rue Des Falaises Ch- 1205 Geneva, Oct. 18, 2013, pp. 1-20.

Katz et al, "BFD for IPv4 and IPv6 (Single Hop); draft-ietf-bfd-v4v6-1hop-07.txt", vol. bfd, No. 7, Jan. 1, 2008, XP015053117.

Bhatia et al, "Bidirectional Forwarding Detection (BFD) on Link Aggregation Group (LAG) Interfaces; draft-mmm-bfd-on-lags-02.txt", Internet Engineering Task Force, IETF; Standardworkingdraft, Internet Society (ISOC) 4, Rue Des Falaises Ch- 1205 Geneva, Switzerland. Jan. 6, 2012, pp. 1-19, XP015080042.

Chen et al, "Bidirectional Forwarding Detection (BFD) for Interface; draft-chen-bfd-interface-00.txt", Engineering Task Force, IETF; standardworkingdraft, Internet Society (ISOC) 4, Rue Des Falaises Ch- 1205 Geneva, Switzerland, Jul. 4, 2011, pp. 1-8, XP015076956.

\* cited by examiner

SYSTEM, METHOD AND APPARATUS PROVIDING BI-DIRECTIONAL FORWARDING DETECTION SUPPORT TO UNNUMBERED IP INTERFACES

FIELD OF THE INVENTION

The invention relates to the field of communication networks such as multi-protocol label switching (MPLS) networks and, more particularly but not exclusively, to a mechanism providing Bi-directional Forwarding Detection support to unnumbered IP Interfaces.

BACKGROUND

For reliable internet traffic delivery via a Multi-Protocol Label Switching (MPLS) network it is important to reduce delay due to connectivity failure. Internet Engineering Task Force (IETF) Request for Comments (RFC) 5880, entitled Bidirectional Forwarding Detection (BFD), describes a low latency protocol for detecting faults in bidirectional paths between two forwarding engines, such as faults within interfaces, data links and the like between network elements or nodes. BFD operates independently of media, data protocols, and routing protocols.

Thus, BFD provides a mechanism to quickly detect connectivity failure so that an alternate connectivity path can be used to restore communication. To detect a data plane failure in the forwarding path of an MPLS Label Switched Path (LSP), a BFD session is established for that MPLS LSP. If the LSP is associated with multiple Forwarding Equivalence Classes (FECs), a BFD session is established for each FEC. BFD control packets are transmitted by the ingress LSR; these packet travel along the same data path as the LSP being verified and are processed at the egress LSR. BFD control packets contain a "discriminator" field to distinguish each BFD session on the LSP. A BFD session is established by sending the BFD session parameters from the ingress LSR to the egress LSR. Unfortunately, BFD cannot presently be used within the context a Multi-Protocol Label Switching (MPLS) network including unnumbered interfaces or links (i.e., interfaces or links that do not have IP addresses).

SUMMARY

Various deficiencies in the prior art are addressed by systems, methods, apparatus and mechanisms providing BFD support to unnumbered IP Interfaces in MPLS networks using a newly defined interface identifier (IF-ID) sub-object included within one or more BFD protocol messages to extend the use of BFD protocol to unnumbered IP interfaces.

A method according to one embodiment of establishing a BFD session between first and second nodes connected via an unnumbered interface comprises: at the first node, transmitting a first BFD control packet toward the second node, the first BFD control packet having a predetermined field including a unique value identifying said first interface; at the first node, in response to receiving a second BFD control packet having a predetermined field including the unique value identifying the first interface, creating an association between the unique value identifying the first interface and a discriminator value associated with the BFD session.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Various embodiments adapt Bidirectional Forwarding Detection (BFD) protocol messages to extend the use of BFD protocol to unnumbered IP interfaces such as within MPLS networks. That is, various embodiments enable the use of BFD as a liveliness detection mechanism for IP/MPLS networks using unnumbered interfaces. In this manner, the rapid network failure detection offered by BFD may be used within the context of IP/MPLS networks running over or including unnumbered interfaces.

Figure 1:
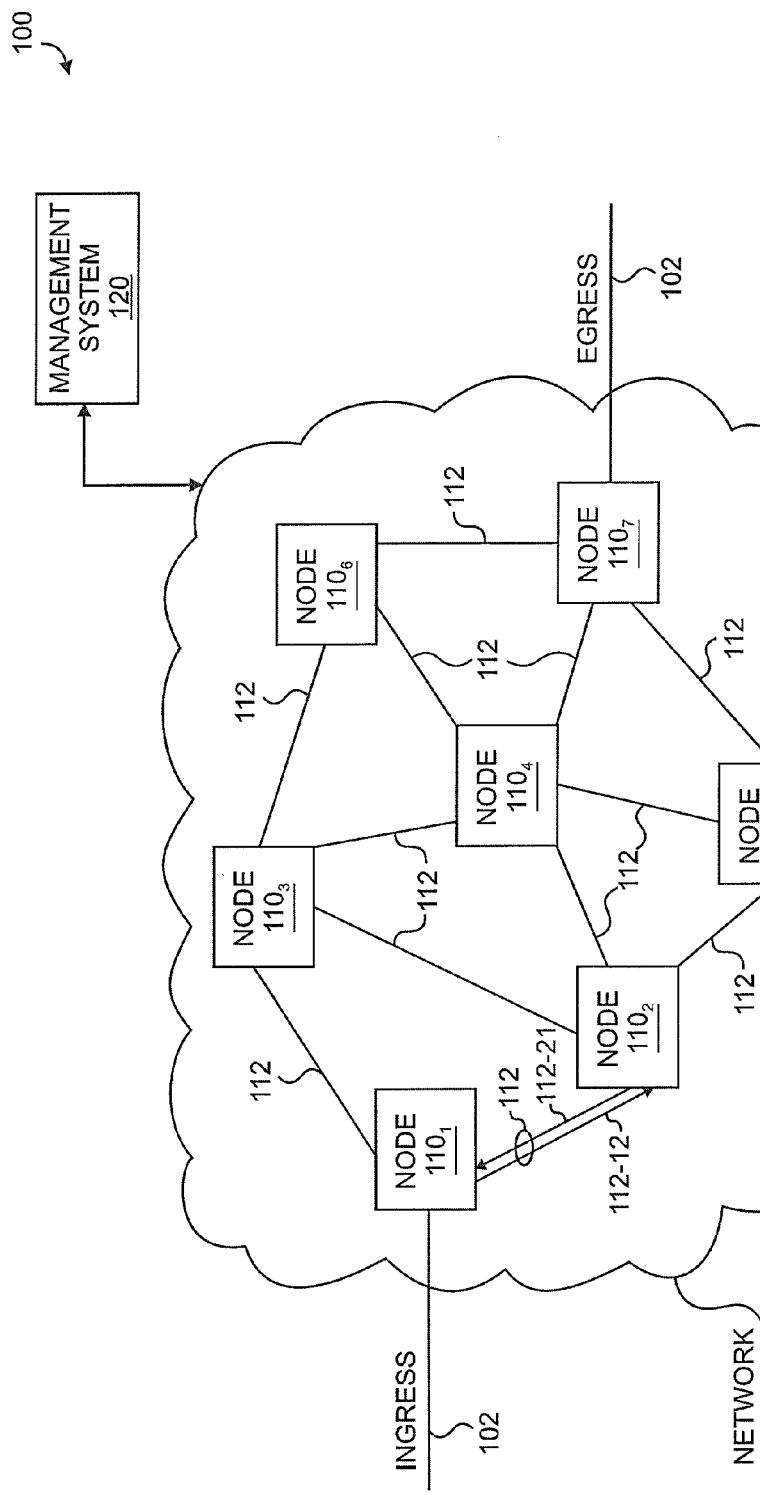
FIG. 1 depicts a high-level block diagram of a communications system benefiting from various embodiments.

FIG. 1 depicts a high-level block diagram of a communications system benefiting from various embodiments. Specifically, the communications system 100 includes an IP/MPLS communication network (CN) 105 and at least one network management system (NMS) 120 operative to, illustratively, route traffic between an originating label switched router (LSR) 110-1 and a destination LSR 110-7 via one or more label switched paths (LSPs). The communications system 100 may be modified by those skilled in the art to use other MPLS related protocols rather than the exemplary protocol discussed herein. The communications system 100 may implement LSPs providing unicast paths or communication technologies (e.g. point to point or P2P), multicast paths of communication technologies (e.g., point-to-multipoint or P2MP), and the like, as well as various combinations thereof.

As depicted, NMS 120 is operative to control a plurality of nodes 110 forming the CN 105; illustratively, a plurality of Label Switched Routers (LSRs) 110-1 through 110-7. It will be noted that while only seven LSRs are depicted, CN 105 may include many more LSRs. The representation of CN 105 is simplified for purposes of this discussion.

The nodes 110 forming the CN 105 support various combinations of network interfaces (NIs) 112 and/or external interfaces (EIs) 102. The nodes 110 communicate with external devices (e.g., nodes of other network domains, user devices, and the like) using EIs 102. NIs 112 may include network links. EIs 102 may include external links.

The NIs 112 and EIs 102 include interfaces or links supporting any communication technologies supported by associated nodes 110. The NIs 112 and EIs 102 may comprise numbered (having an IP address) or unnumbered (i.e., not having an IP address) interfaces or links. For purposes of this discussion, it will be assumed that each of the nodes 110 is connected to one or more neighbor nodes via a network interface (NI) 112 comprising a respective pair of unnumbered interfaces, each of the unnumbered interfaces being associated with a respective unique identifier. For example, FIG. 1 depicts the pair of unnumbered interfaces (i.e., interfaces 112-12 and 112-21) connecting nodes 110-1 and 110-2. However, each of the connections 112 between the various nodes 110 comprise a pair of unnumbered interfaces such as depicted with respect to nodes 110-1 and 110-2. The first interface 112-12 propagates data from node 110-1 toward node 110-2; the second interface 112-21 propagates data from node 110-2 toward node 110-1. Similarly, though not shown and described in further detail herein, node 110-2 is connected to node 110-5 via an interface pair 112 comprising a first interface 112-25 and a second interface 112-52, node 110-5 is connected to node 110-7 via an interface pair 112 comprising a first interface 112-57 and a second interface 112-72 and so on.

Although primarily depicted and described herein with respect to a communication network having specific types, numbers, and configurations of nodes 110, NIs 112, and EIs 102, the present embodiments may be implemented in communication networks having various other types, numbers, and configurations of nodes 110, NIs 112, and EIs 102.

The NMS 120 is a network management system adapted for performing the various management functions described herein. The NMS 120 is adapted to communicate with nodes of CN 105. The NMS 120 may also be adapted to communicate with other operations support systems (e.g., Element Management Systems (EMSs), Topology Management Systems (TMSs), and the like, as well as various combinations thereof).

The NMS 120 may be implemented at a network node, network operations center (NOC) or any other location capable of communication with CN 105 and various elements related thereto. NMS 120 may support user interface capabilities to enable one or more users to perform various network management, configuration, provisioning or control related functions (e.g., enter information, review information, initiate execution of various methods as described herein and the like). Various embodiments of the NMS 120 are adapted to perform functions as discussed herein with respect to the various embodiments. The NMS 120 may be implemented as a general purpose computing device or specific purpose computing device, such as described below with respect to FIG. 2 or 4.

Various embodiments will be described within the context of a network supporting Multi-Protocol Label switching (MPLS), such as defined in IETF RFC3031 and RFC5036, each of which is herein incorporated by reference in its respective entirety.

LDP (Label Distribution Protocol) is a signaling protocol for set up and maintenance of MPLS LSPs (Label Switched Paths), and for distributing labels for setting up LSPs. LDP comprises a set of procedures and messages by which Label Switch Routers (LSRs) establish Label Switched Paths (LSPs) through a network by mapping network-layer routing information directly to data-link layer switched paths (i.e., the LSPs). These LSPs may have an endpoint at a directly attached neighbor (comparable to IP hop-by-hop forwarding), an endpoint at a network egress node enabling thereby label switching via all intermediary nodes and the like.

LDP associates a Forwarding Equivalence Class (FEC) with each LSP it creates. The FEC associated with an LSP specifies which packets are "mapped" to that LSP. This FEC is the "context" of a label. LSPs are extended through a network as each LSR "splices" incoming labels for a FEC to the outgoing label assigned by the next hop for the given FEC.

In various embodiments, neighboring LSR nodes maintain UDP based Hello Adjacencies and a TCP based Session. The Link level Hello Adjacencies determine the links over which directly peering LSRs want to send/receive LSP traffic. The Targeted Hello Adjacencies can be multiple hops away in a network and forms a multi-hop LDP session between non-directly connected LDP LSRs. The LDP Session is the channel through which all labels and various signaling parameters are exchanged (e.g. Label Mappings) with respect to various FECs.

BFD establishes a session between two endpoints over a particular link. If more than one link exists between the two endpoints, then multiple BFD sessions may be established to monitor each one of them. A BFD session is established with a three-way handshake, and is torn down the same way. Authentication may be enabled on the session. A choice of simple password, MD5 or SHA1 authentication is available.

Specifically, since BFD does not have a discovery mechanism, BFD sessions must be explicitly configured between endpoints. BFD may be used on many different underlying transport mechanisms and layers, and operates independently of all of these. BFD control packets are encapsulated using whatever transport mechanism is appropriate to the network. For example, monitoring MPLS LSPs as described herein involves piggybacking session establishment on LSP-Ping packets.

A BFD session may operate in an asynchronous mode wherein both endpoints periodically send Hello packets to each other; failure to receive a packet within a defined interval means that the BFD session is considered to be down or failed. A BFD session may also operate in a demand mode wherein hello packet exchange is not necessarily used to indicate BFD session failure; rather, some other mechanism is used to indicate a BFD session failure. BFD session endpoints may also initiate an Echo function in which a first endpoint transmits a stream of Echo packets to a second endpoint, which in turn transmits the stream of Echo packets back to the first endpoint via its forwarding plane.

In various embodiments, where neighboring LSR nodes communicate via bidirectional unnumbered interfaces or links (e.g., interface payers 112), a mechanism is provided whereby the nodes may create associations between a unique value or identifier for each interface or link within the context of a BFD session. For example, each of the nodes may build a table or other data structure including information associating interface or link identifiers with various protocols, BFD sessions and the like such that corrective measures may be taken with respect to the protocols/BFD sessions and the like in response to the corresponding interface failure.

In various embodiments, the "discriminator" field of BFD control packets used to distinguish each BFD session on the LSP is used within the context of a handshake mechanism between nodes to establish there between BFD sessions via unnumbered interfaces were in the unnumbered interfaces are given unique identification numbers.

Figure 2:
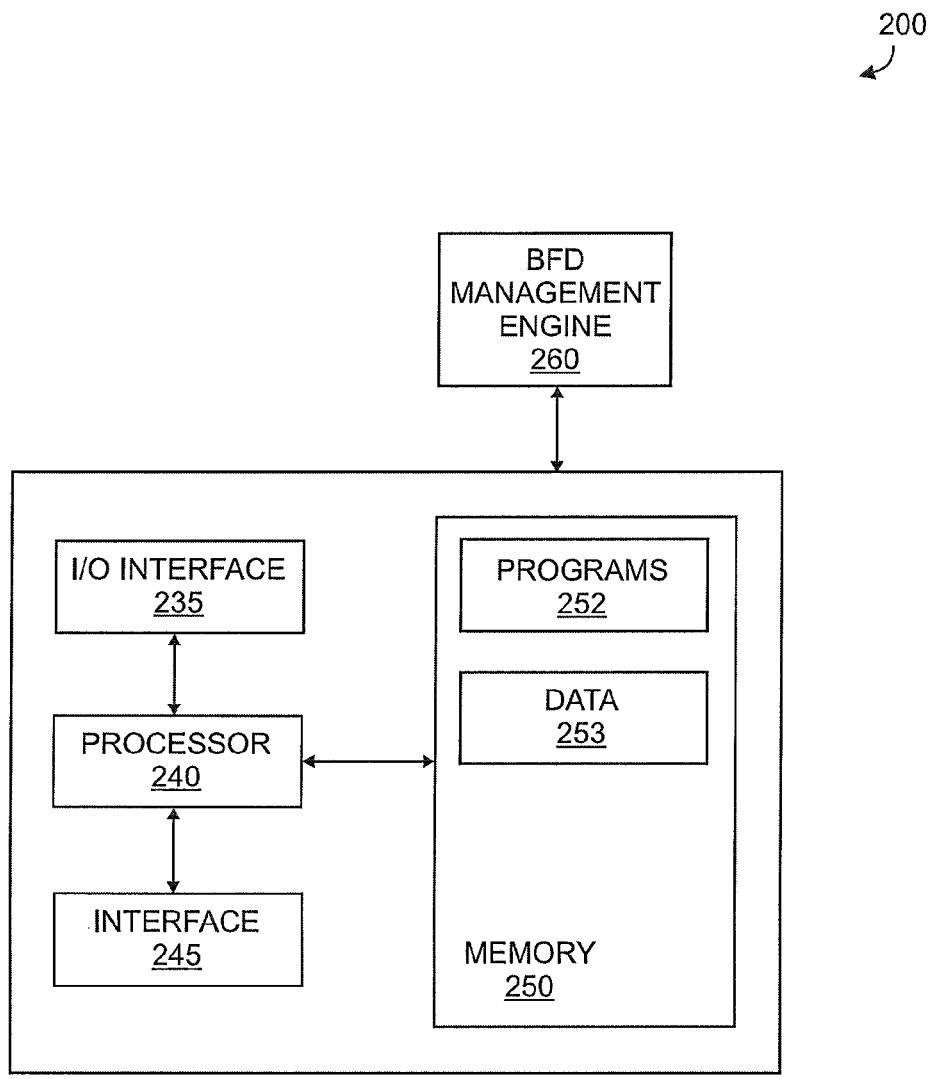
FIG. 2 depicts a high level block diagram of a control portion of an exemplary node suitable for implementing various embodiments.

FIG. 2 depicts a high level block diagram of a control portion 200 of an exemplary node suitable for implementing various embodiments, such as a control portion of LDP nodes 110. As depicted in FIG. 2, a node control portion 200 includes one or more processor(s) 240, a memory 250, an input/output (I/O) interface 235 and network interface 245.

The processor(s) 240 are adapted to cooperate with the memory 250, the network interface 245, the I/O interface 235 and the like to provide the various functions described herein with respect to the nodes 110. In various embodiments, the control portion 200 of an exemplary node may be implemented as described below with respect to the computing device of FIG. 4.

The memory 250, generally speaking, stores programs, data, tools and the like that are adapted for use in providing various control plane and data plane functions associated with the nodes 110. The memory 250 is depicted as storing programs 252 and data 253 useful in supporting the various control plane and data plane functions depicted and described herein. For example, memory 250 is depicted as storing programs 222 and data 223 adapted for use in providing various computing and hosting functions within the MPLS communication system.

Also depicted in FIG. 2 is a BFD Management Engine 260 which may be implemented as hardware or firmware modules external to the node control portion 200 described herein. In various embodiments, this engine may be included within or implemented by the node control portion 200 or nodes 110 described herein.

In various embodiments, this memory 250 includes programs and data associated with BFD Management Engine 260. In various embodiments, the BFD Management Engine 260 is implemented using software instructions which may be executed by a processor (e.g., processor 203) for performing the various functionalities depicted and described herein.

I/O interface 235 and network interface 245 are adapted to facilitate communications with peripheral devices both internal and external to processor 240. For example, I/O interface 235 is adapted to interface with memory 250. Similarly, I/O interface 235 is adapted to facilitate communications with LDP node 110$_N$, BFD Management Engine 260 and the like. In various embodiments, a connection is provided between processor ports and any peripheral devices used to communicate with the MPLS network (not shown).

Although primarily depicted and described with respect to LDP node 110 control portion communication with BFD Management Engine 260, it will be appreciated that I/O interface 235 may be adapted to support communications with any other devices suitable for providing the BFD session control mechanisms described herein with respect to unnumbered interfaces or links.

Although depicted and described with respect to embodiments in which the BFD Management Engine 260 is external and/or internal to the depicted control portion 200 of an exemplary node, it will be appreciated by those skilled in the art that the BFD Management Engine 260 may be stored in one or more other storage devices internal and/or external to LDP node 110 and/or node control portion 200 thereof. The engine may be distributed across any suitable numbers and/or types of storage devices internal and/or external to LDP node 110 and/or node control portion 200 thereof. Memory 250, including the engine of memory 250, is described in additional detail herein below.

In various embodiments, BFD Management Engine 260 is adapted to configure and manage a BFD session between two endpoints associated with a unidirectional or bidirectional interface or link.

Unnumbered Interfaces

Within the context of the various embodiments, BFD will be used as a mechanism to detect interface or link failures. In the case of unnumbered interfaces or links, these typically share a common IP address which is a node ID or router ID. However, various embodiments provide a mechanism for interacting between BFD endpoint nodes separated by unnumbered interfaces or links. Further, the mechanism provides a handshake mechanism enabling the BFD endpoint nodes to identify unnumbered interfaces or links between them, establish a BFD session there between and adapt the BFD session to changes in BFD state (i.e., up, down, active, failed and so on).

BFD Over Unnumbered Interface (BUI) TLV

Various embodiments use a new Type-Length-Value (TLV) element denoted herein as a "BUI" TLV suitable for use by a LSR to indicate to a corresponding LSR peer (e.g., an adjacent LSR) that an interface conveying traffic there between is an unnumbered interface that will be used to support BFD functionality.

RFC 5880 provides a BFD packet structure having a mandatory portion according to the following format:

```
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| Vers | Diag | Sta | P | F | C | A | D | M | Detect Mult | Length |
+-+-+-+-+-+-+-+-+-+-+-+-+-+-+-+-+-+-+-+-+-+-+-+-+-+-+-+-+-+-+-+-+
|                       My Discriminator                        |
+-+-+-+-+-+-+-+-+-+-+-+-+-+-+-+-+-+-+-+-+-+-+-+-+-+-+-+-+-+-+-+-+
|                      Your Discriminator                       |
+-+-+-+-+-+-+-+-+-+-+-+-+-+-+-+-+-+-+-+-+-+-+-+-+-+-+-+-+-+-+-+-+
|                    Desired Min TX Interval                    |
+-+-+-+-+-+-+-+-+-+-+-+-+-+-+-+-+-+-+-+-+-+-+-+-+-+-+-+-+-+-+-+-+
|                    Required Min RX Interval                   |
+-+-+-+-+-+-+-+-+-+-+-+-+-+-+-+-+-+-+-+-+-+-+-+-+-+-+-+-+-+-+-+-+
|                  Required Min Echo RX Interval                |
+-+-+-+-+-+-+-+-+-+-+-+-+-+-+-+-+-+-+-+-+-+-+-+-+-+-+-+-+-+-+-+-+
```

In various embodiments, a new TLV is included for BFD sessions established between endpoints connected by unnumbered interfaces or links. Thus, in one embodiment, a BFD over Unnumbered Interface (BUI) TLV of the following form is used:

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| Type. |   Len   |    IF_ID...    |                           |
+-+-+-+-+-+-+-+-+-+-+-+-+-+-+-+-+-+-+-+-+-+-+-+-+-+-+-+-+-+-+-+-+
```

The exemplary BUI TLV is suitable for transmission via, illustratively, an optional parameter in a LDP Hello Message configured as a BFD control packet to identify thereby a specific unnumbered interface or link.

Various embodiments provide for an unnumbered interface or link identification mechanism suitable for uniquely identifying unnumbered interface or links interfaces or links between endpoints such as within the context of BFD session management. In other embodiments, each node implements a set of BUI TLV for each unnumbered interface or link.

Generally speaking, the "My Discriminator" field contains a unique, nonzero discriminator value generated by the transmitting node which may be used to demultiplex multiple BFD sessions between the transmitting node and receiving node, while the "Your Discriminator" field is used by a receiving node to reflect back to the transmitting node a previously received "My Discriminator" value. These fields are used within the context of various embodiments to exchange and agree upon unique values for identifying unnumbered interfaces or links between nodes.

Figure 3A:
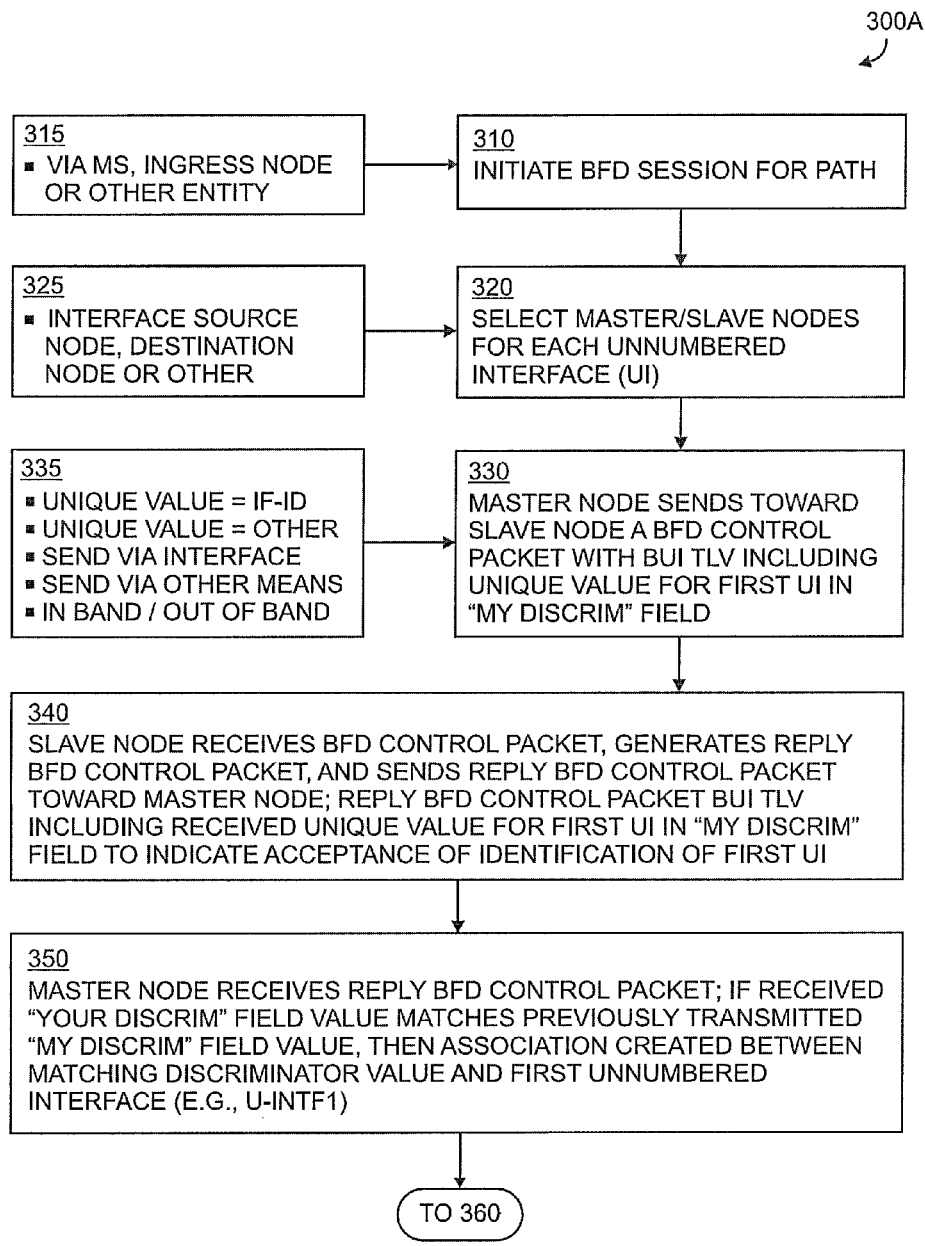
FIGS. 3A and 3B depict flow diagrams of a method according to one embodiment.
Figure 3B:
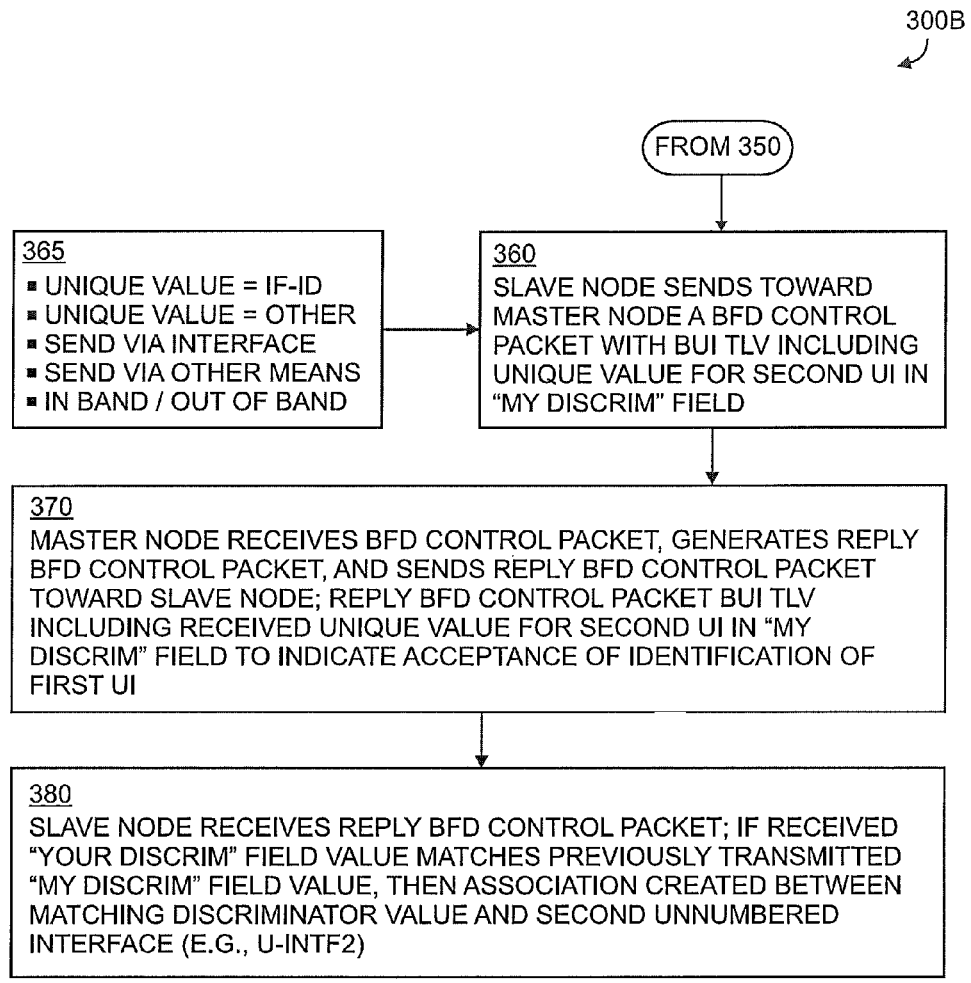

FIGS. 3A and 3B (collectively FIG. 3) depict a flow diagram of a method according to one embodiment. Specifically, the method 300 of FIG. 3 provides a handshake mechanism whereby two endpoints connected via a bidirectional unnumbered interface or link may establish and maintain a BFD session in which unnumbered interface or link is associated with a unique identifier.

The method 300 begins at step 310 when a BFD session is initiated for a path, such as a LSP within an MPLS network connecting an ingress node and an egress node. Referring to box 315, the BFD session may be initiated via the management system (MS), the ingress node of an LSP or some other entity. Generally speaking, a BFD session is initiated for each directly interconnected pair of nodes along this path, some of which may be interconnected by unnumbered links or interfaces. The method 300 fines particular utility within the context of node pairs interconnected by unnumbered links or interfaces. For example, assuming a LSP is formed using nodes 110-1, 110-2, 110-5 and 110-7, then the method 300 is invoked for each of the following pairs of nodes: 110-1/110-2; 110-2/110-5; and 110-5/110-7.

At step 320, for each node pair interconnected by an unnumbered interface (UI), one node is selected as a master node and one node is selected as a slave node. Referring to box 325, the master node may comprise the interface source node (i.e., the node from which an unnumbered interface emanates), the interface destination node (i.e., the node at which an unnumbered interface terminates), or some other node.

For purposes of this discussion, it will be assumed that the master node for any pair of nodes using the method is the node closest to the ingress node (i.e., fewest hops from the ingress node). Further, it will be assumed that a first unnumbered interface conveys traffic from the master node to the slave node, while a second unnumbered interface conveys traffic from the slave node to the master node.

For example, assume that first node 110-1 and second node 110-2 are connected by two parallel unnumbered interfaces 112; namely, a first unnumbered interface 112-12 (denoted at u-Intf1) carrying traffic from first node 110-1 to second node 110-2, and a second unnumbered interface 112-21 (denoted as u-Intf2) carrying traffic from second node 110-2 to first node 110-1. Since both of the interfaces 112-12 and 112-21 are unnumbered, they will share a common IP address; namely, a node ID or router ID.

Each of the interfaces 112-12 and 112-21 are associated with a unique Interface Identifier (IF-ID). The IF-ID may be defined according to, illustratively, IETF RFC 3945 or some other mechanism. Similarly, procedures for exchanging IF-IDs between the various LSRs 105-N may be provided according to IET RFS 3477, 3630 and related. According to various embodiments, BFD will be used as a mechanism to detect link failures on either of the unnumbered interfaces 106.

At step 330, the master node transmits toward the slave node and initial BFD control packet with a BUI TLV including a unique value identifying the first unnumbered interface within the "My Discriminator" field. Referring to box 335, the unique value comprises an interface identification (IF-ID) or some other unique value. Further, the initial BFD control packet may be transmitted via the first unnumbered interface or via some other means. The initial BFD control packet may be transmitted via an in-band mechanism or an out-of-band mechanism. The unique value may be assigned by the master node, by the network management system or by some other entity. The unique value may be assigned according to a sequence of unique values, a pool of unique values and so on.

For example, first node 110-1 may transmit a first BFD control packet to second node 110-2 via the first unnumbered interface 112-12 (i.e., u-Intf1), where the "My Discriminator" field of the BFD control packet includes a unique identification of the first unnumbered interface 112-12.

At step 340, the slave node receives the initial BFD control packet and generates a reply BFD control packet to be transmitted toward the master node. The reply BFD control packet with a BUI TLV including the unique value identifying the first unnumbered interface within the "My Discriminator" field (to a acknowledge acceptance of the unique value as identifying the first unnumbered interface) and a value in the "Your Discriminator" field copied from the "My Discriminator" field of the BFD control packet received from the master node (to reflect back to the transmitting node the value previously received in the "My Discriminator" field).

For example, second node 110-2 receives the first BFD control packet from first node 110-1 via the first unnumbered interface 112-12. The unique identification of the first unnumbered interface 112-12 is extracted from the "My Discriminator" field of the received BFD control packet and inserted into the "Your Discriminator" field of a second BFD control packet (to reflect back the received value) as well as the "My Discriminator" field of the second BFD control packet (to acknowledge acceptance of the unique value as identifying the first unnumbered interface 112-12).

At step 350, the master node receives the reply BFD control packet transmitted at step 340 by the slave node. If the "My Discriminator" value in the reply BFD control packet matches the "My Discriminator" value of initial BFD control packet then agreement between the two nodes as to identification of the first unnumbered interface is reached, and the master node creates an association between the matching discriminator values and the first unnumbered interface. This association may be made by updating a local table or other data structure.

For example, first node 110-1 receives the second BFD control packet from second node 110-2. Upon determining that a match has occurred, the master node creates an association between the matching discriminator value and the first unnumbered interface 112-12 (i.e., u-Intf1).

The above-described steps 330-350 operates to provide identification of a first unnumbered interface of a pair of unnumbered interfaces between two nodes, illustratively denoted as a master node and a slave node. BFD control packets transmitted between the two nodes may be via by whichever interface within a pair of interfaces able to support such transmission. Thus, the functions associated with steps 330-350 us be repeated to provide identification of a second unnumbered interface of the pair of unnumbered interfaces between the two nodes. This is accomplished using, illustratively, steps 360-380 is provided below.

At step 360, the slave node transmits toward the master node an initial BFD control packet with a BUI TLV including a unique value identifying the second unnumbered interface within the "My Discriminator" field. Referring to box 365, the unique value comprises an interface identification (IF-ID) or some other unique value. Further, the initial BFD control packet may be transmitted via the second unnumbered interface or via some other means. The initial BFD control packet may be transmitted via an in-band mechanism or an out-of-band mechanism. The unique value may be assigned by the slave node, by the network management system or by some other entity. The unique value may be assigned according to a sequence of unique values, a pool of unique values and so on.

For example, second node 110-2 may transmit a third BFD control packet to first node 110-1 via the second unnumbered interface 112-21 (i.e., u-Intf2), where the "My Discriminator" field of the BFD control packet includes a unique identification of the second unnumbered interface 112-21.

At step 370, the master node receives the initial BFD control packet and generates a reply BFD control packet to be transmitted toward the slave node. The reply BFD control packet with a BUI TLV including the unique value identifying the second unnumbered interface within the "My Discriminator" field (to a acknowledge acceptance of the unique value as identifying the second unnumbered interface) and a value in the "Your Discriminator" field copied from the "My Discriminator" field of the BFD control packet received from the slave node (to reflect back to the transmitting node the value previously received in the "My Discriminator" field).

For example, first node 110-1 receives the third BFD control packet from second node 110-2 via the second unnumbered interface 112-21. The unique identification of the second unnumbered interface 112-21 is extracted from the "My Discriminator" field of the received BFD control packet and inserted into the "Your Discriminator" field of a fourth BFD control packet (to reflect back the received value) as well as the "My Discriminator" field of the fourth BFD control packet (to acknowledge acceptance of the unique value as identifying the second unnumbered interface 112-21).

At step 380, the slave node receives the reply BFD control packet transmitted at step 360 by the master node. If the "My Discriminator" value in the reply BFD control packet matches the "My Discriminator" value of initial BFD control packet then agreement between the two nodes as to identification of the second unnumbered interface is reached, and the slave node creates an association between the matching discriminator values and the second unnumbered interface. This association may be made by updating a local table or other data structure.

For example, second node 110-2 receives the fourth BFD control packet from first node 110-1. Upon determining that a match has occurred, the slave node creates an association between the matching discriminator value and the second unnumbered interface 112-12 (i.e., u-Intf2).

Generally speaking, each of the nodes updates its respective mapping table or other data structure to maintain a current mapping of BFD discriminators with uniquely identified unnumbered interfaces such that a correlation between a failed unnumbered interface and one or more protocols, services and the like identified via BFD discriminator values may be provided for use in various troubleshooting functions, provisioning/reprovisioning functions, failure/restoration functions, and other management functions. For example, in response to determining that a particular interface has failed, management system may responsibly identify which protocols, services and the like are associated with the failed interface such that appropriate measures may be taken.

Generally speaking, each of creates a respective table or other data structure that maps the received discriminator value to the interface identifier by which the discriminator value was received. In this manner, whenever a BFD failure is detected, the information within the table may be used to determine which interface is associated with the BFD session such that all protocols associated with the interface may be informed of the failure of that interface.

Each node receiving a BFD packet via an unnumbered interface may responsively create a table entry associating the discriminator value of the received BFD packet and the unique identifier associated with the interface by which BFD packet is received.

Thus, in various embodiments, the various methods described herein are repeated for each of a plurality of adjacent node pairs forming a LSP that are connected via unnumbered interfaces.

Exemplary tables maintaining a current mapping of BFD discriminators with uniquely identified unnumbered interfaces are provided below for the first node 110-1 (Table 1) and second node 110-2 (Table 2).

TABLE 1

| Node 110-1 | | |
| --- | --- | --- |
| Interface | Interface identifier | Discriminators |
| 112-12 | u-Intf1 | |
| 112-21 | u-Intf2 | |
| 112-13 | u-Intf3 | |
| 112-31 | u-Intf4 | |

TABLE 2

| Node 110-2 | | |
| --- | --- | --- |
| Interface | Interface identifier | Discriminators |
| 112-12 | u-Intf1 | |
| 112-21 | u-Intf2 | |
| 112-23 | u-Intf5 | |
| 112-32 | u-Intf6 | |
| 112-24 | u-Intf7 | |
| 112-42 | u-Intf8 | |
| 112-25 | u-Intf9 | |
| 112-52 | u-Intf10 | |

The various methodologies described herein operate to uniquely identify multiple parallel interfaces or interface pairs as shown. The method 300 provides a mechanism whereby the pair of nodes (e.g., master node and slave node) interact with each other to agree upon a unique identifier to be associated with an unnumbered interface such that the unnumbered interface may be correlated to the BFD session and any other protocols associated with the interface. The method 300 may be repeated for each of the node pairs of an LSP interconnected via unnumbered interfaces. For any parallel interface or interface pair, a BFD packet transmitted via the first of the two parallel interfaces will carry the identifier representing the first interface while a BFD packet transmitted via the second of the two parallel interfaces will carry the identifier representing the second interface. These identifiers are used as noted herein with respect to the various embodiments.

The various steps described above provide a handshake mechanism adapted to establish a BFD session between master and slave nodes communicating via unnumbered bidirectional interfaces or links. After the BFD session is established, subsequent BFD packets are communicated between the nodes without using the BUI TLV since the discriminator is sufficient to identify the BFD session and interface.

In various embodiments, the handshake mechanism provided herein may be repeated anytime a state transition occurs within the context of the established BFD session, such as a transition from Admin Down state to Admin Up state, a transition from Operational Down state to Operational Up state and so on.

In various embodiments, the steps are generic to any BFD endpoint node or intermediate node in that a received the BFD control packet having a value within the "Your Discriminator" field matching the value within the "My Discriminator" field of a previously transmitted BFD control packet will result in an association being created between the matching discriminator values any interface via which the BFD control packet was received. In general speaking, the various embodiments contemplate a handshake mechanism using predetermined fields associated with BFD control packets, illustratively the "My Discriminator" and "Your Discriminator" fields. Other fields and/or mechanisms may be used for this purpose.

Various embodiments are also adapted to use cases in which only one of the interfaces or links are unnumbered. For example, first interface 112-12 may be unnumbered while second interface 112-21 may have an IP address associated with it. In this case, both the first and second nodes will likely have identification information pertaining to the IP address of the second interface 112-21. This IP address may be included within each BFD control packet as appropriate such that the vehicle should mechanism is only used to the extent necessary to associate the unique value for the unnumbered interface (illustratively, first interface 112-12).

Although primarily depicted and described with respect to the enumerated embodiments, other embodiments associated with a specific network may be implemented using other procedures and combinations of the above.

Figure 4:
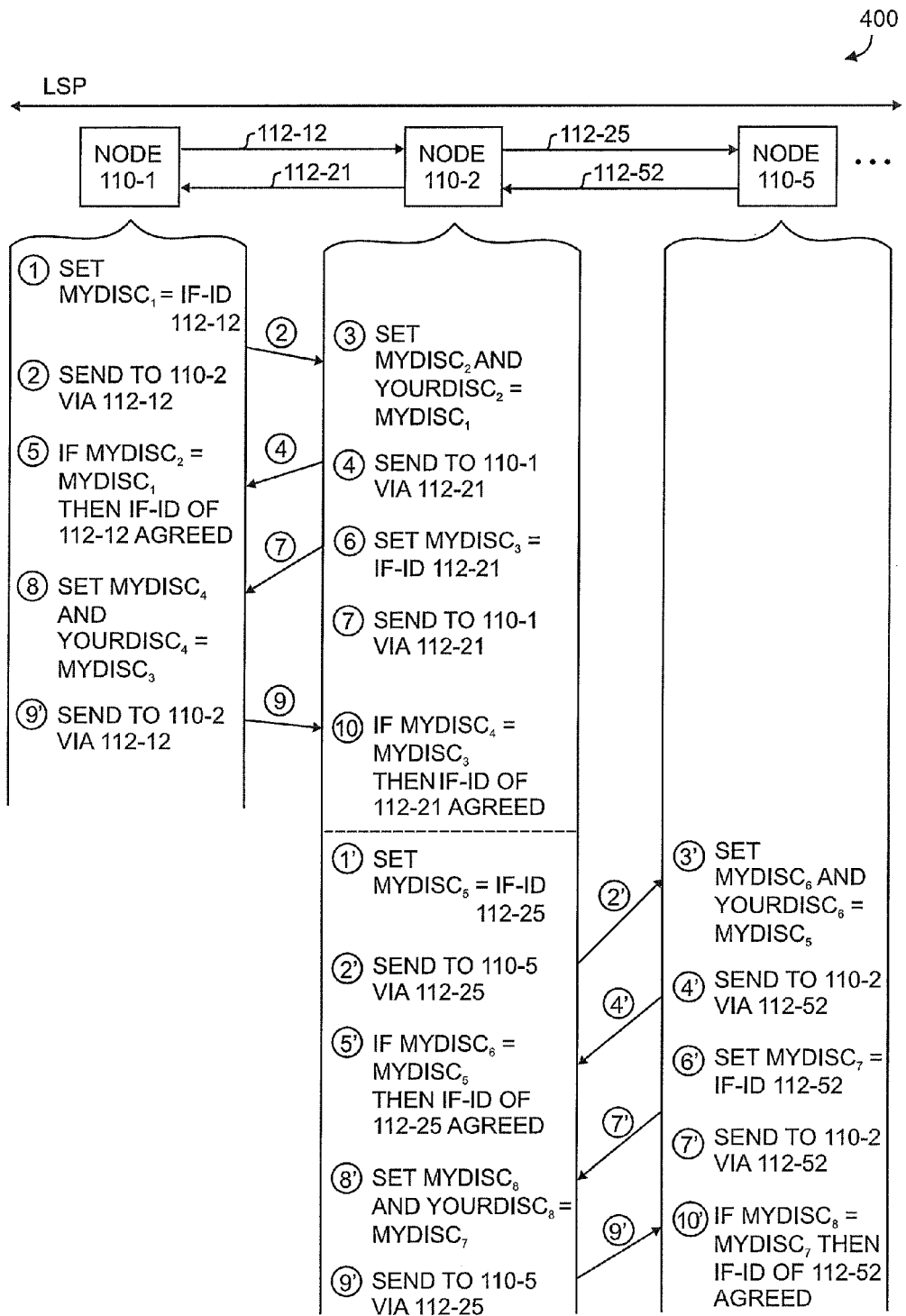
FIG. 4 depicts a protocol diagram illustrating a methodology according to one embodiment.

FIG. 4 depicts a protocol diagram illustrating a methodology according to one embodiment. Generally speaking, the protocol diagram 400 of FIG. 4 depicts various steps such as described above with respect to the method 300 of FIG. 3, such steps being adapted to agree upon interface identifiers (IF-IDs) for identifying unnumbered interfaces interconnecting node pairs (e.g., node pair 110-1/110-2 and node pair 110-2/110-5) as described herein.

FIG. 4 depicts three nodes 110-1, 110-2 and 110-3 within a label switched path (LSP). The first node 110-1 communicates data to the second node 110-2 via a first unnumbered interface 112-12, and receives data from the second node 110-2 via a second unnumbered interface 112-21. Similarly, the second node 110-2 communicates data to the third node 110-5 via a third unnumbered interface 110-25, and receives data from the third node 110-5 via a fourth unnumbered interface 112-52.

Steps 1-5 depict a mechanism by which nodes 110-1 and 110-2 agree upon an interface identifier (IF-ID) associated with first unnumbered interface 112-12. Specifically, at step 1, at node 110-1 the MYDISC field of a first BFD control packet is given a value corresponding to a proposed IF-ID for use in identifying first unnumbered interface 112-12. At step 2, the first BFD control packet is propagated from the first node 110-1 to the second node 110-2 via the first unnumbered interface 112-12. At step 3, the second node 110-2 copies the value from the MYDISC field of the received first BFD control packet to the MYDISC and YOURDISC fields of a second BFD control packet. At step 4, the second BFD control packet is propagated from the second node 110-2 to the first node 110-1 via the second unnumbered interface 112-21. At step 5, the first node 110-1 receives the second BFD control packet and determines that the IF-ID proposed for identifying first unnumbered interface 112-12 is agreed if the value of the MYDISC field of the second BFD control packet match the value of the MYDISC field of the first BFD control packet. If not agreed, then steps 1-5 may be repeated.

Steps 6-10 depict a mechanism by which nodes 110-1 and 110-2 agree upon an interface identifier (IF-ID) associated with second unnumbered interface 112-21. Specifically, at step 6, at node 110-2 the MYDISC field of a third BFD control packet is given a value corresponding to a proposed IF-ID for use in identifying second unnumbered interface 112-21. At step 7, the second BFD control packet is propagated from the second node 110-2 to the first node 110-1 via the second unnumbered interface 112-21. At step 8, the first node 110-1 copies the value from the MYDISC field of the received third BFD control packet to the MYDISC and YOURDISC fields of a fourth BFD control packet. At step 9, the fourth BFD control packet is propagated from the first node 110-1 to the second node 110-2 via the first unnumbered interface 112-12. At step 10, the second node 110-2 receives the fourth BFD control packet and determines that the IF-ID proposed for identifying second unnumbered interface 112-21 is agreed if the value of the MYDISC field of the fourth BFD control packet matches the value of the MYDISC field of the third BFD control packet. If not agreed, then steps 6-10 may be repeated.

Steps 1'-5' depict a mechanism by which nodes 110-2 and 110-5 exchange respective fifth and sixth BFD control packets to agree upon an interface identifier (IF-ID) associated with third unnumbered interface 112-25. The mechanism of steps 1'-5' operates in substantially the same manner as described above with respect to steps 1-5 and, as such, will not be described in further detail.

Steps 6'-10' depict a mechanism by which nodes 110-2 and 110-5 exchange respective seventh and eighth BFD control packets to agree upon an interface identifier (IF-ID) associated with fourth unnumbered interface 112-52. The mechanism of steps 6'-10' operates in substantially the same manner as described above with respect to steps—6-10 and, as such, will not be described in further detail.

It will be appreciated that the steps 1-10 described herein with respect to first node pair 110-1/110-2 may be performed before, after, or contemporaneously with the corresponding steps 1 -10' described herein with respect to second node pair 110-2/110-5. Further, it will be appreciated that the steps 1-5, 1'-5', 6-10 and 6'-10' described herein with respect to agreeing upon an identification associated with a single unnumbered interface may be performed in any order. Further, each node 110 may perform the various steps described herein with respect to any other node with which it is connected via unnumbered interfaces.

Figure 5:
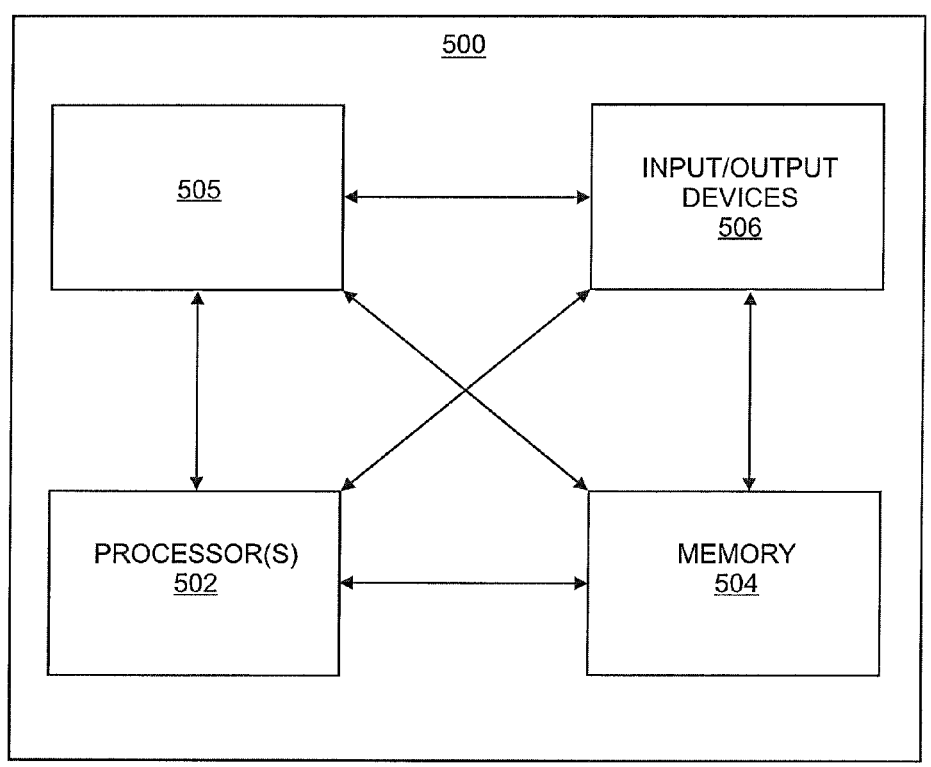
FIG. 5 depicts a high-level block diagram of a computing device, such as a processor in a telecom network element, suitable for use in performing functions described herein.

FIG. 5 depicts a high-level block diagram of a computing device, such as a processor in a telecom network element, suitable for use in performing functions described herein such as those associated with the various elements described herein with respect to the figures.

As depicted in FIG. 5, computing device 500 includes a processor element 503 (e.g., a central processing unit (CPU) and/or other suitable processor(s)), a memory 504 (e.g., random access memory (RAM), read only memory (ROM), and the like), a cooperating module/process 505, and various input/output devices 506 (e.g., a user input device (such as a keyboard, a keypad, a mouse, and the like), a user output device (such as a display, a speaker, and the like), an input port, an output port, a receiver, a transmitter, and storage devices (e.g., a persistent solid state drive, a hard disk drive, a compact disk drive, and the like)).

It will be appreciated that the functions depicted and described herein may be implemented in hardware and/or in a combination of software and hardware, e.g., using a general purpose computer, one or more application specific integrated circuits (ASIC), and/or any other hardware equivalents. In one embodiment, the cooperating process 505 can be loaded into memory 504 and executed by processor 503 to implement the functions as discussed herein. Thus, cooperating process 505 (including associated data structures) can be stored on a computer readable storage medium, e.g., RAM memory, magnetic or optical drive or diskette, and the like.

It will be appreciated that computing device 500 depicted in FIG. 5 provides a general architecture and functionality suitable for implementing functional elements described herein or portions of the functional elements described herein.

It is contemplated that some of the steps discussed herein may be implemented within hardware, for example, as circuitry that cooperates with the processor to perform various method steps. Portions of the functions/elements described herein may be implemented as a computer program product wherein computer instructions, when processed by a computing device, adapt the operation of the computing device such that the methods and/or techniques described herein are invoked or otherwise provided. Instructions for invoking the inventive methods may be stored in tangible and non-transitory computer readable medium such as fixed or removable media or memory, and/or stored within a memory within a computing device operating according to the instructions.

Although various embodiments which incorporate the teachings of the present invention have been shown and described in detail herein, those skilled in the art can readily devise many other varied embodiments that still incorporate these teachings. Thus, while the foregoing is directed to various embodiments of the present invention, other and further embodiments of the invention may be devised without departing from the basic scope thereof. As such, the appropriate scope of the invention is to be determined according to the claims.

What is claimed is:

1. A method of establishing a Bidirectional Forwarding Detection (BFD) session between a first node and a second node, the method comprising:
   at the first node, transmitting a first BFD control packet toward the second node via a first unnumbered interface of the first node, the first BFD control packet having a predetermined field including a unique value identifying the first unnumbered interface of the first node, the first BFD control packet having an interface identification field including an interface identifier of the first unnumbered interface of the first node; and
   at the first node, in response to receiving a second BFD control packet having a first predetermined field including the unique value identifying the first unnumbered interface of the first node and having a second predetermined field including the unique value identifying the first unnumbered interface of the first node, creating an association between the unique value identifying the first unnumbered interface of the first node and the interface identifier of the first unnumbered interface of the first node.

2. The method of claim 1, further comprising:
   at the second node, transmitting a third BFD control packet toward the first node via a second unnumbered interface of the second node, the third BFD control packet having a predetermined field including a second unique value identifying the second unnumbered interface of the second node, the second BFD control packet having an interface identification field including an interface identifier of the second unnumbered interface of the second node; and
   at the second node, in response to receiving a fourth BFD control packet having a first predetermined field including the second unique value identifying the second unnumbered interface of the second node and having a second predetermined field including the second unique value identifying the second unnumbered interface of the second node, creating an association between the second unique value identifying the second unnumbered interface of the second node and the interface identifier of the second unnumbered interface of the second node.

3. The method of claim 1, wherein the predetermined field of the first BFD control packet comprises a "My Discriminator" field, wherein the first predetermined field of the second BFD control packet comprises a "My Discriminator" field and the second predetermined field of the second BFD control packet comprises a "Your Discriminator" field.

4. The method of claim 1, wherein the association between the unique value identifying the first unnumbered interface of the first node and the interface identifier of the first unnumbered interface of the first node is stored as an entry in a table at the first node.

5. The method of claim 1, wherein, the interface identification field including the interface identifier of the first unnumbered interface of the first node is included in a BFD over Unnumbered Interface (BUI) TLV.

6. The method of claim 1, wherein at least one of the first BFD control packet is included within a Label Distribution Protocol (LDP) Hello Message or the second BFD control packet is included within an LDP Hello Message.

7. An apparatus, comprising:
   a processor and a memory communicatively connected to the processor, the processor configured to establish a Bidirectional Forwarding Detection (BFD) session between a first node and a second node, the processor configured to:
      at the first node, transmit a first BFD control packet toward the second node via a first unnumbered interface of the first node, the first BFD control packet having a predetermined field including a unique value identifying the first unnumbered interface of the first node, the first BFD control packet having an interface identification field including an interface identifier of the first unnumbered interface of the first node; and
      at the first node, in response to receiving a second BFD control packet having a first predetermined field including the unique value identifying the first unnumbered interface of the first node and having a second predetermined field including the unique value identifying the first unnumbered interface of the first node, create an association between the unique value identifying the first unnumbered interface of the first node and the interface identifier of the first unnumbered interface of the first node.

8. A non-transitory computer-readable storage medium storing instructions which, when executed by a computer, adapt the operation of the computer to provide a method for establishing a Bidirectional Forwarding Detection (BFD) session between a first node and a second node, the method comprising:
   at the first node, transmitting a first BFD control packet toward the second node via a first unnumbered interface of the first node, the first BFD control packet having a predetermined field including a unique value identifying the first unnumbered interface of the first node, the first BFD control packet having an interface identification field including an interface identifier of the first unnumbered interface of the first node; and at the first node, in response to receiving a second BFD control packet having a first predetermined field including the unique value identifying the first unnumbered interface of the first node and having a second predetermined field including the unique value identifying the first unnumbered interface of the first node, creating an association between the unique value identifying the first unnumbered interface of the first node and the interface identifier of the first unnumbered interface of the first node.

9. A computer program product comprising a non-transitory computer-readable storage medium having stored thereon computer instructions which, when executed by a processor in a telecom network element, adapt the operation of the telecom network element to provide a method for establishing a Bidirectional Forwarding Detection (BFD) session between a first node and a second node, the method comprising:
   at the first node, transmitting a first BFD control packet toward the second node via a first unnumbered interface of the first node, the first BFD control packet having a predetermined field including a unique value identifying the first unnumbered interface of the first node, the first BFD control packet having an interface identification field including an interface identifier of the first unnumbered interface of the first node; and
   at the first node, in response to receiving a second BFD control packet having a first predetermined field including the unique value identifying the first unnumbered interface of the first node and having a second predetermined field including the unique value identifying the first unnumbered interface of the first node, creating an association between the unique value identifying the first unnumbered interface of the first node and the interface identifier of the first unnumbered interface of the first node.

10. The method of claim 1, wherein the predetermined field of the first BFD control packet comprises a "My Discriminator" field.

11. The method of claim 10, wherein the first predetermined field of the second BFD control packet comprises a "My Discriminator" field, wherein the second predetermined field of the second BFD control packet comprises a "Your Discriminator" field.

12. The apparatus of claim 7, wherein the predetermined field of the first BFD control packet comprises a "My Discriminator" field, wherein the first predetermined field of the second BFD control packet comprises a "My Discriminator" field and the second predetermined field of the second BFD control packet comprises a "Your Discriminator" field.

13. The apparatus of claim 7, wherein the processor is configured to:
   store the association between the unique value identifying the first unnumbered interface of the first node and the interface identifier of the first unnumbered interface of the first node as an entry in a table at the first node.

14. The apparatus of claim 7, wherein the interface identification field including the interface identifier of the first unnumbered interface of the first node is included in a BFD over Unnumbered Interface (BUI) TLV.

15. The apparatus of claim 7, wherein at least one of the first BFD control packet is included within a Label Distribution Protocol (LDP) Hello Message or the second BFD control packet is included within an LDP Hello Message.

16. The apparatus of claim 7, wherein the predetermined field of the first BFD control packet comprises a "My Discriminator" field.

17. The apparatus of claim 16, wherein the predetermined field of the first BFD control packet comprises a "My Discriminator" field, wherein the first predetermined field of the second BFD control packet comprises a "My Discriminator" field and the second predetermined field of the second BFD control packet comprises a "Your Discriminator" field.

18. An apparatus, comprising:
   a processor and a memory communicatively connected to the processor, the processor configured to establish a Bidirectional Forwarding Detection (BFD) session between a first node and a second node, the processor configured to:
      at the first node, receive a first BFD control packet from the second node, the first BFD control packet having a predetermined field including a unique value identifying a first unnumbered interface of the second node, the first BFD control packet having an interface identification field including an interface identifier of the first unnumbered interface of the second node; and
      at the first node, transmit a second BFD control packet toward the second node, the second BFD control packet having a first predetermined field including the unique value identifying the first unnumbered interface of the second node and a second predetermined field including the unique value identifying the first unnumbered interface of the second node.

* * * * *